United States Patent
Sato

(10) Patent No.: US 8,325,374 B2
(45) Date of Patent: Dec. 4, 2012

(54) PRINTING APPARATUS AND PRINT CONTROL METHOD FOR MANAGING A BUILT-IN MASS STORAGE DEVICE

(75) Inventor: Hajime Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1264 days.

(21) Appl. No.: 11/855,891

(22) Filed: Sep. 14, 2007

(65) Prior Publication Data

US 2008/0068656 A1  Mar. 20, 2008

(30) Foreign Application Priority Data

Sep. 20, 2006  (JP) ................ 2006-254661

(51) Int. Cl.
*G06K 15/00* (2006.01)
*G06K 9/60* (2006.01)

(52) U.S. Cl. .......... 358/1.16; 358/1.15; 358/1.17; 358/1.9; 358/1.2; 358/1.6; 358/3.13; 358/3.26; 358/296; 358/468; 382/115; 382/118; 382/149; 382/195; 382/305

(58) Field of Classification Search .......... None
See application file for complete search history.

(56) References Cited

U.S. PATENT DOCUMENTS

| | | | | |
|---|---|---|---|---|
| 6,282,687 | B1 * | 8/2001 | Maeda et al. | 714/763 |
| 7,042,584 | B1 * | 5/2006 | Watanabe et al. | 358/1.15 |
| 7,227,660 | B2 * | 6/2007 | Maruyama | 358/1.15 |
| 7,259,876 | B2 * | 8/2007 | Obata et al. | 358/1.13 |
| 7,793,207 | B2 * | 9/2010 | Ishizaki | 715/201 |
| 2002/0067515 | A1 * | 6/2002 | Abe | 358/442 |

FOREIGN PATENT DOCUMENTS

| | | |
|---|---|---|
| DE | 4229266 A1 | 3/1994 |
| JP | 63-185274 A | 7/1988 |
| JP | 10-210196 A | 8/1998 |
| JP | 10-210247 A | 8/1998 |
| JP | 2000-347823 A | 12/2000 |
| JP | 2003-084956 A | 3/2003 |

* cited by examiner

*Primary Examiner* — Steven Kau

(74) *Attorney, Agent, or Firm* — Canon U.S.A., Inc. IP Division

(57) ABSTRACT

A printing apparatus includes a built-in hard disk drive configured to operate as a mass storage device. The printing apparatus includes an HDD control unit configured to store print image data into the hard disk drive; a secondary storage unit configured to store the print image data; an HDD state detection unit configured to detect a state of the hard disk drive; and a storage method changing unit configured to change a storage method of the print image data based on the state of the hard disk drive detected by the HDD state detection unit.

6 Claims, 7 Drawing Sheets

PRINTING APPARATUS AND PRINT CONTROL METHOD FOR MANAGING A BUILT-IN MASS STORAGE DEVICE

BACKGROUND OF THE INVENTION

1. Field of the Invention

The present invention relates to a printing apparatus associated with a host computer, and more particularly to a printing apparatus equipped with a hard disk drive (HDD) serving as a mass storage device.

2. Description of the Related Art

As discussed in Japanese Patent Application Laid-Open No. 10-210196, a conventional printing apparatus includes a built-in hard disk drive (HDD) functioning as a mass storage device that can store print image data received from an external device.

Furthermore, as discussed in Japanese Patent Application Laid-Open No. 10-210247, a conventional printing apparatus includes an HDD (as a mass storage device) that can be attached and detached by a user.

The printing apparatus discussed in Japanese Patent Application Laid-Open No. 10-210247 enables a user to remove the HDD when the HDD fails, and changes a flow direction of print image data so that a user can use the printing apparatus without using the HDD.

However, according to the printing apparatus discussed in Japanese Patent Application Laid-Open No. 10-210196, a user cannot remove the HDD from the printing apparatus.

Accordingly, if the built-in HDD fails, the printing apparatus cannot process and transfer print image data. A user cannot use the printing apparatus unless a service staff replaces a failed HDD with a new HDD.

SUMMARY OF THE INVENTION

Exemplary embodiments of the present invention are directed to a printing apparatus that does not allow a user to remove a built-in HDD. The exemplary embodiments of the present invention enable a user to continuously use the printing apparatus when the HDD fails. The exemplary embodiments of the present invention are also related to a method for controlling the printing apparatus.

An aspect of the present invention provides a printing apparatus including a built-in hard disk drive configured to operate as a mass storage device. The printing apparatus includes an HDD control unit configured to store print image data into the hard disk drive; a secondary storage unit configured to store the print image data as an auxiliary storage device different from the hard disk drive; an HDD state detection unit configured to detect a state of the hard disk drive; and a storage method changing unit configured to change a storage method of the print image data based on the state of the hard disk drive detected by the HDD state detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
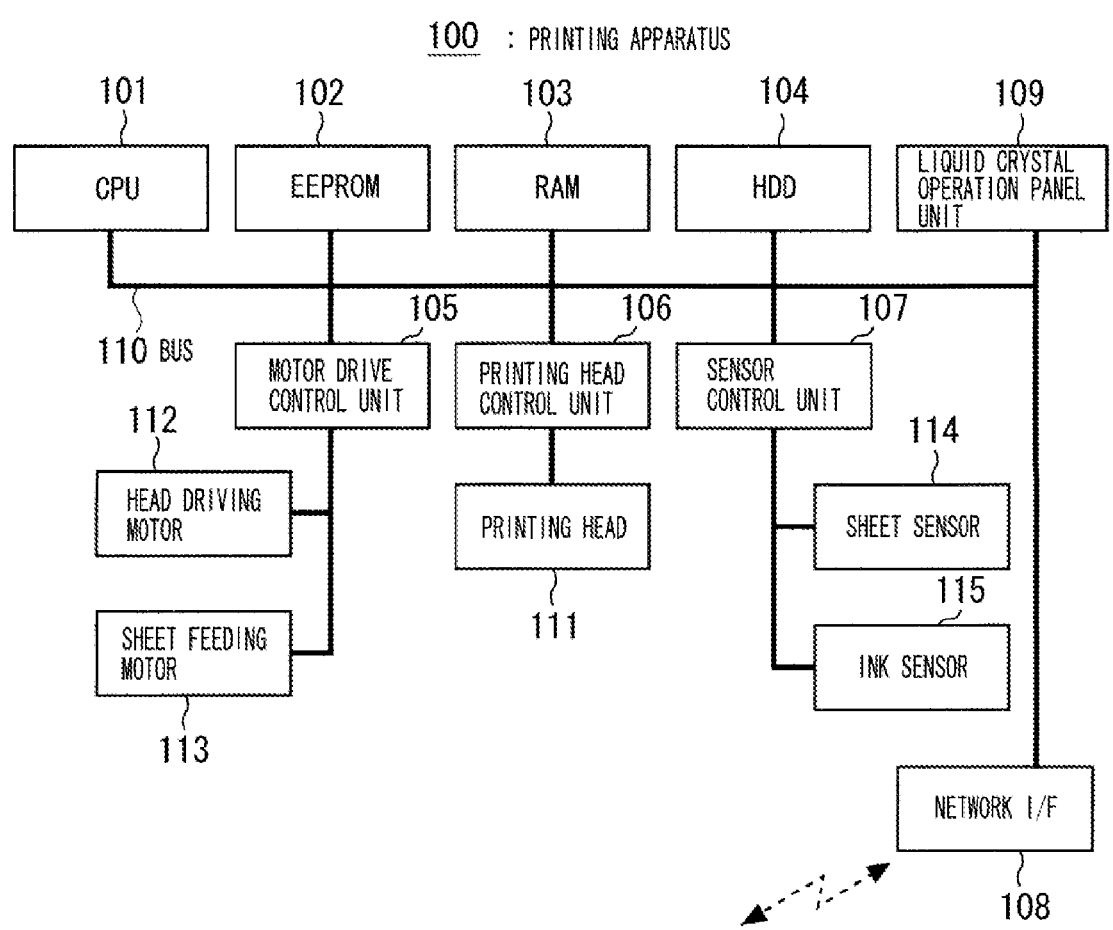
FIG. 1 is a block diagram illustrating a printing apparatus according to an exemplary embodiment of the present invention.

The following description of exemplary embodiments is illustrative in nature and is in no way intended to limit the invention, its application, or uses.

Processes, techniques, apparatus, and systems as known by one of ordinary skill in the art are intended to be part of the enabling description where appropriate.

It is noted that throughout the specification, similar reference numerals and letters refer to similar items in the following figures, and thus, once an item is described in one figure, it may not be discussed for following figures.

Exemplary embodiments will be described in detail below with reference to the drawings.

FIG. 1 illustrates a printing apparatus 100 according to an exemplary embodiment of the present invention.

The printing apparatus 100 includes a CPU 101, an electrically erasable and programmable read only memory (EEPROM) 102, a random access memory (RAM) 103, a hard disk drive (HDD) 104, a motor drive control unit 105, a printing head control unit 106, and a sensor control unit 107. Furthermore, the printing apparatus 100 includes a network interface (network I/F) 108, a liquid crystal operation panel unit 109, a bus 110, a printing head 111, a head driving motor 112, a sheet feeding drive motor 113, a sheet sensor 114, and an ink sensor 115.

The CPU 101 controls an operation of the printing apparatus 100. The EEPROM 102 stores an operation processing program of the printing apparatus 100 and various setting data of the printing apparatus 100. The RAM 103 temporarily stores various calculation/processing data of the printing apparatus 100 that are written and read by the CPU 101. The printing apparatus 100 also includes a ROM (not shown) that stores a control program, which, when executed, controls operation of the printing apparatus 100. The program when executed controls the printing apparatus to perform the methods illustrated in FIGS. 3 to 7 and described in more detail below.

The HDD 104 stores print image data that the printing apparatus 100 can print.

The motor drive control unit 105 controls the head driving motor 112 and the sheet feeding drive motor 113 of the printing apparatus 100. The printing head control unit 106 controls the printing head 111 that performs an ink discharge operation.

The sensor control unit 107 obtains sensing information from various sensors and outputs the sensing information to the CPU 101. The network I/F 108 can communicate with a host computer via a network and receive print data from the host computer.

The liquid crystal operation panel unit 109 includes a message display unit and an operation input unit. The message display unit includes a screen that displays a message character string (e.g., printing apparatus name, operational state, operational instruction, etc) to a user. The operation input unit includes various keys that enable a user to input an instruction.

The above-described functional units 101 through 109 can mutually transmit and receive information/data via the bus 110.

The printing head 111 can discharge an ink to a sheet. The head driving motor 112 drives the printing head 111. The sheet feeding drive motor 113 can feed a sheet.

The sheet sensor 114 detects the presence and the number of sheets. The ink sensor 115 detects a remaining amount of ink that can be discharged from the printing head 111.

The motor drive control unit 105 controls the head driving motor 112 and the sheet feeding drive motor 113. The printing head control unit 106 controls the printing head 111. The sensor control unit 107 controls the sheet sensor 114 and the ink sensor 115.

The CPU 101 is an exemplary HDD control unit configured to store print image data into the HDD 104.

The EEPROM 102 is an exemplary secondary storage unit configured to store print image data.

Furthermore, the CPU 101 functions as an exemplary HDD state detection unit configured to detect a state of the HDD 104. The CPU 101 also functions as an exemplary storage method changing unit configured to change a storage method of print image data based on the state of the HDD 104 detected by the HDD state detection unit.

The liquid crystal operation panel unit 109 is an exemplary operation display panel unit. The CPU 101 can function as an exemplary operation display panel control unit configured to cause the operation display panel unit to display a state of failure according to a state of the HDD 104 detected by the HDD state detection unit in a startup operation of the printing apparatus 100.

In the exemplary embodiment, the CPU 101 interrupts startup processing of the printing apparatus 100 according to a state of the HDD 104 detected by the HDD state detection unit, until a user inputs an instruction via the operation display panel unit.

Next, an exemplary print data processing procedure performed by the printing apparatus 100 is described below.

Figure 2:
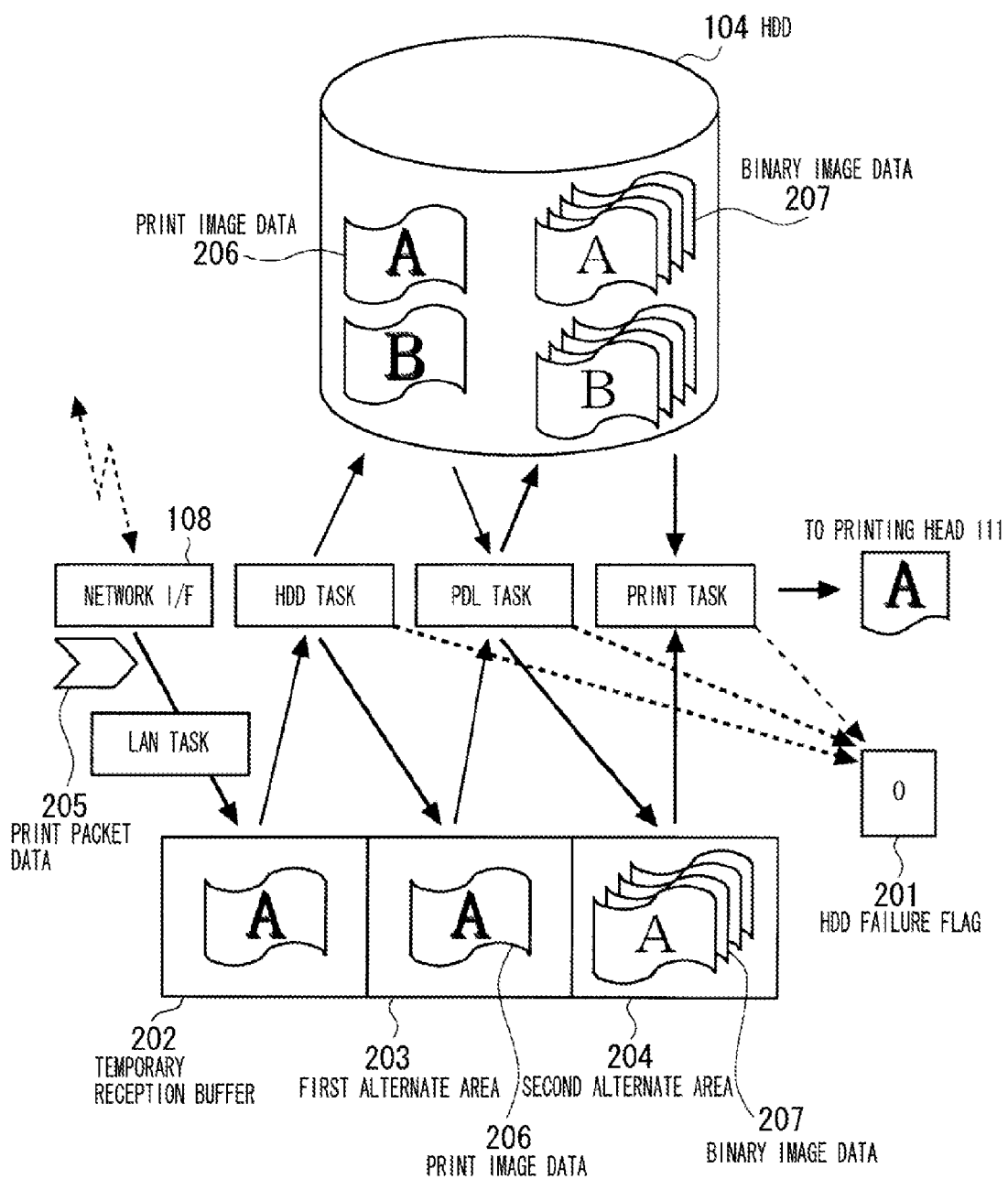
FIG. 2 illustrates exemplary flows of operation in the printing apparatus according to an exemplary embodiment of the present invention.

FIG. 2 illustrates exemplary flows of operation in the printing apparatus 100.

In the printing apparatus 100, the CPU 101 can execute plural tasks concurrently for the print image data to be processed. For example, the plural tasks include a network task, an HDD management task, a print language execution task, and a print execution task.

As illustrated in FIG. 2, the HDD 104 of the printing apparatus 100 stores print image data 206 and binary image data 207.

The EEPROM 102 has a variables area that stores an HDD failure flag 201. The HDD failure flag 201 is set to "0" when the HDD 104 is in an ordinary state. The HDD failure flag 201 being set to "0" indicates that the HDD 104 is in a normal operation state.

The RAM 103 includes a temporary reception buffer 202 that stores print image data 206 received via the network I/F 108. Furthermore, RAM 103 includes a first alternate area 203 that stores print image data 206 and a second alternate area 204 that stores binary image data 207.

Each of the HDD 104, the temporary reception buffer 202, the first alternate area 203, and the second alternate area 204 can store a predetermined volume of data.

A storage capacity of the first alternate area 203 or the second alternate area 204 is smaller than a storage capacity of the HDD 104.

Next, an exemplary network task (local area network (LAN) task) is described below.

Figure 3:
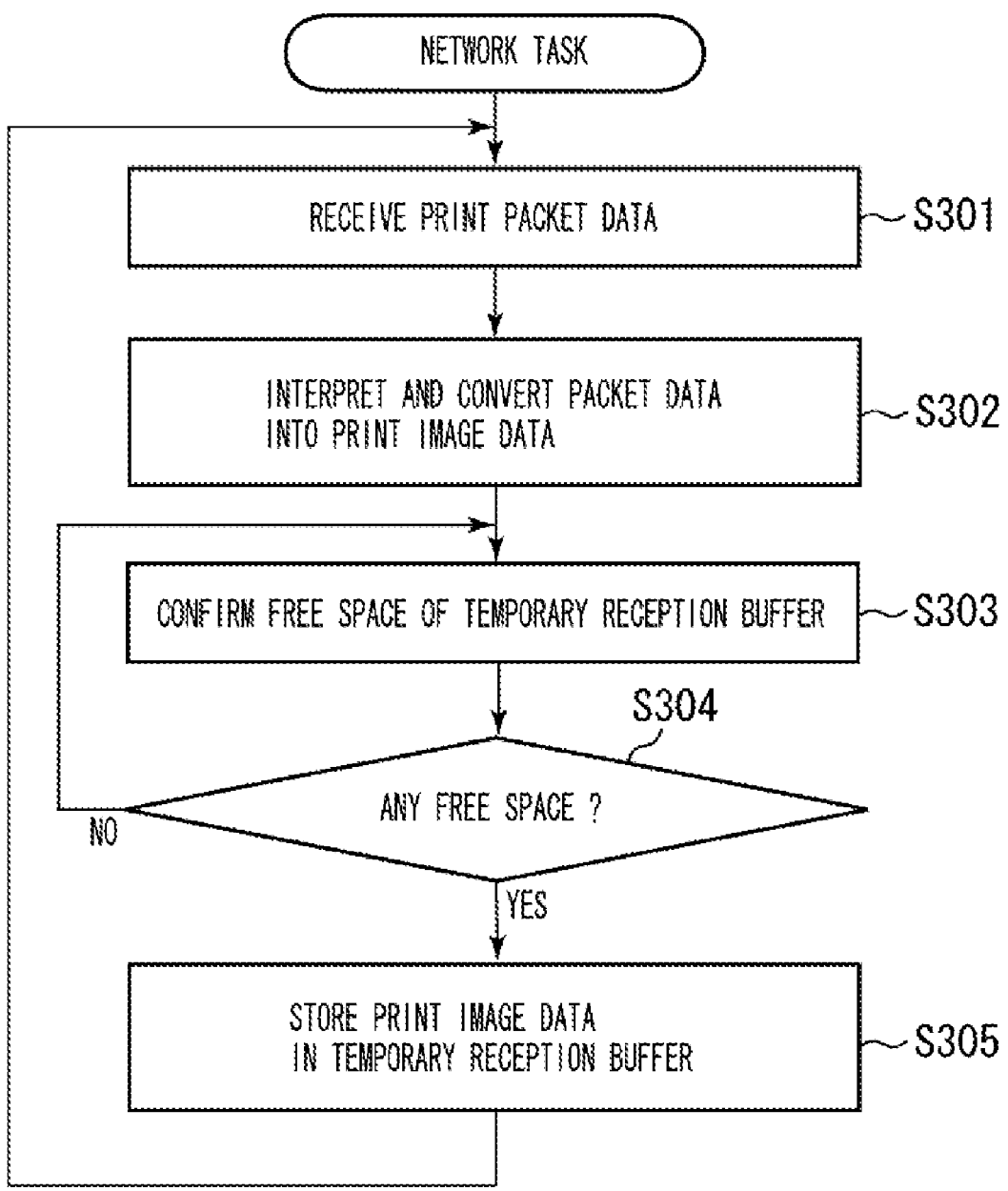
FIG. 3 is a flowchart illustrating a processing procedure of a network task according to an exemplary embodiment of the present invention.

FIG. 3 is a flowchart illustrating a processing procedure of a network task according to an exemplary embodiment of the present invention.

When a host computer transmits print data via a network, the printing apparatus 100 receives print packet data 205 divided according to a network protocol via the network I/F 108.

In step S301, the CPU 101 receives the print packet data 205 via the network I/F 108. In step S302, the CPU 101 interprets each network protocol packet and obtains print image data 206.

In step S303, the CPU 101 checks (confirms) a free space of the temporary reception buffer 202. In step S304, the CPU 101 determines whether any free space remains in the temporary reception buffer 202. If the CPU 101 determines that there is no free space (NO in step S304), the processing flow returns to step S303 to repeat the above-described processing (i.e., check the remaining free space again).

If the CPU 101 determines that the temporary reception buffer 202 has a free space (YES in step S304), the processing flow proceeds to step S305. In step S305, the CPU 101 stores the print image data 206 into the temporary reception buffer 202. The processing flow returns to step S301 to repeat the above-described processing.

Figure 4:
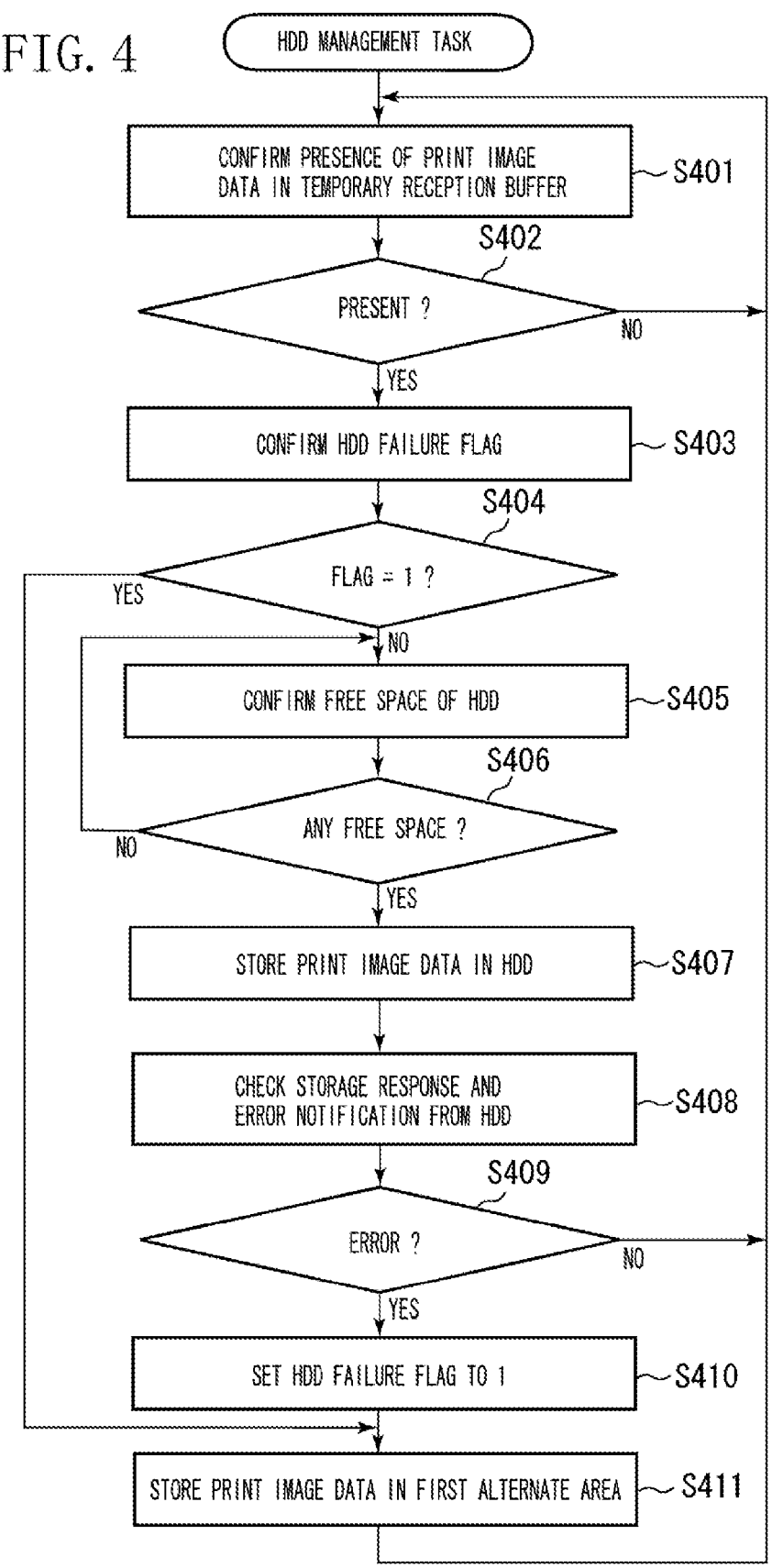
FIG. 4 is a flowchart illustrating a processing procedure of a hard disk drive (HDD) management task according to an exemplary embodiment of the present invention.

FIG. 4 is a flowchart illustrating a processing procedure of a HDD task according to an exemplary embodiment of the present invention.

In step S401 of the HDD management task, the CPU 101 checks (confirms) the presence of print image data 206 in the temporary reception buffer 202. In step S402, the CPU 101 determines whether the print image data 206 is present in the temporary reception buffer 202. If the CPU 101 determines that the temporary reception buffer 202 does not store the print image data 206 (NO in step S402), the processing flow returns to step S401 to repeat the above-described processing.

If the CPU 101 determines that the temporary reception buffer 202 stores the print image data 206 (YES in step S402), the processing flow proceeds to step S403. In step S403, the CPU 101 confirms the HDD failure flag 201.

If the CPU 101 determines that the HDD failure flag 201 indicates "1" (YES in step S404), the processing flow proceeds to step S411. If the CPU 101 determines that the HDD failure flag 201 indicates "0" (NO in step S404), the processing flow proceeds to step S405. In step S405, the CPU 101 checks a free space of the HDD 104.

In step S406, the CPU 101 determines whether the HDD 104 has any free space. If the CPU 101 determines that the HDD 104 has no free space (NO in step S406), the processing flow returns to step S405 to repeat the above-described processing.

If the CPU 101 determines that the HDD 104 has a free space (YES in step S406), the processing flow proceeds to step S407. In step S407, the CPU 101 stores the generated print image data 206 into the HDD 104.

In step S408, the CPU 101 confirms the presence of any error occurring in the HDD 104 during the processing of step S407 (i.e., processing for storing the print image data 206 into the HDD 104).

If the CPU 101 determines that the HDD 104 has no error (NO in step S409), the processing flow directly returns to step S401.

If the CPU 101 determines that the HDD 104 has an error (YES in step S409), the processing flow proceeds to step S410. In step S410, the CPU 101 sets the HDD failure flag 201 to "1." In step S411, the CPU 101 stores the print image data 206 into the first alternate area 203. Then, the processing flow returns to step S401.

Figure 5:
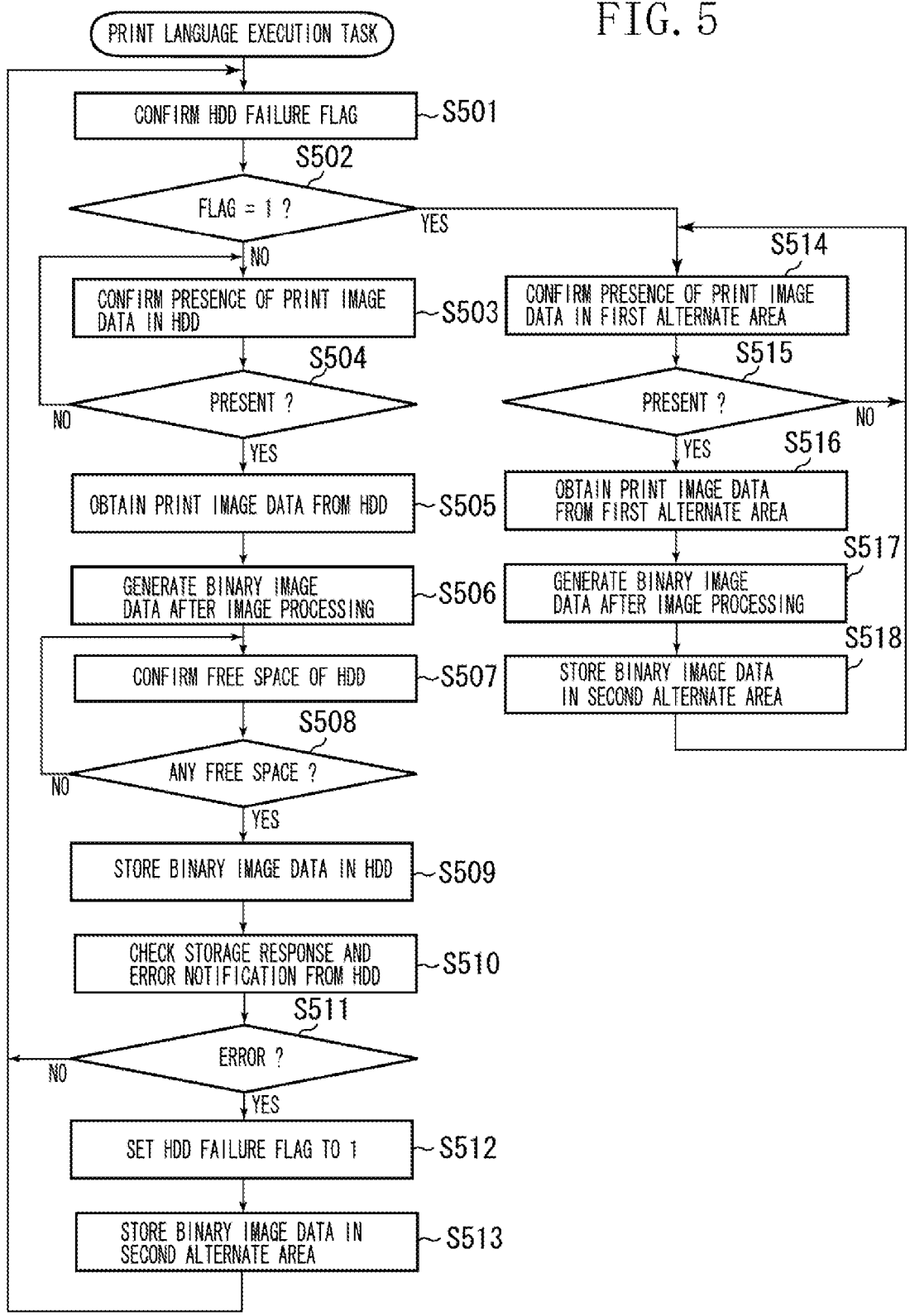
FIG. 5 is a flowchart illustrating a processing procedure of a print language execution task according to an exemplary embodiment of the present invention.

FIG. 5 is a flowchart illustrating a processing procedure of a print language execution task (PDL task) according to an exemplary embodiment of the present invention.

In step S501 of the print language execution task, the CPU 101 confirms the HDD failure flag 201. In step S502, the CPU 101 determines whether the HDD failure flag 201 indicates "1." If the CPU 101 determines that the HDD failure flag 201 indicates "1" (YES in step S502), the processing flow proceeds to step S514. If the CPU 101 determines that the HDD failure flag 201 indicates "0" (NO in step S502), the processing flow proceeds to step S503. In step S503, the CPU 101 checks the presence of print image data 206 stored in the HDD 104.

In step S504, the CPU 101 determines whether the print image data 206 is present in the HDD 104. If the CPU 101 determines that the HDD 104 does not store the print image data 206 (NO in step S504), the processing flow returns to step S503 to repeat the above-described processing.

If the CPU 101 determines that the HDD 104 stores the print image data 206 (YES in step S504), the processing flow proceeds to step S505. In step S505, the CPU 101 reads (obtains) the print image data 206 from the HDD 104.

In step S506, the CPU 101 interprets print language data and performs image processing on the read print image data 206, and generates binary image data 207 of each ink color.

In step S507, the CPU 101 checks a free space of the HDD 104. In step S508, the CPU 101 determines whether the HDD 104 has any free space. If the CPU 101 determines that the HDD 104 has no free space (NO in step S508), the processing flow returns to step S507 to repeat the above-described processing.

If the CPU 101 determines that the HDD 104 has a free space (YES in step S508), the processing flow proceeds to step S509. In step S509, the CPU 101 stores the generated binary image data 207 of each ink color into the HDD 104.

In step S510, the CPU 101 confirms the presence of any error occurring in the HDD 104 during the processing of step S509 (i.e., processing for storing the binary image data 207 into the HDD 104).

If the CPU 101 determines that the HDD 104 has no error (NO in step S511), the processing flow directly returns to step S501.

If the CPU 101 determines that the HDD 104 has an error (YES in step S511), the processing flow proceeds to step S512. In step S512, the CPU 101 sets the HDD failure flag 201 to "1."In step S513, the CPU 101 stores the binary image data 207 into the second alternate area 204. Then, the processing flow returns to step S501.

If the CPU 101 determines that the HDD failure flag 201 indicates "1" (YES in step S502), the processing flow proceeds to step S514. In step S514, the CPU 101 checks the presence of print image data 206 stored in the first alternate area 203. Instep S515, the CPU 101 determines whether the print image data 206 is present in the first alternate area 203. If the CPU 101 determines that the first alternate area 203 does not store the print image data 206 (NO in step S515), the processing flow returns to step S514 to repeat the above-described processing.

If the CPU 101 determines that the first alternate area 203 stores the print image data 206 (YES in step S515), the processing flow proceeds to step S516. In step S516, the CPU 101 reads (obtains) the print image data 206 from the first alternate area 203.

In step S517, the CPU 101 interprets print language data and performs image processing on the read print image data 206, and generates binary image data 207 of each ink color.

In step S518, the CPU 101 stores the binary image data 207 into the second alternate area 204. Then, the processing flow returns to step S514.

Figure 6:
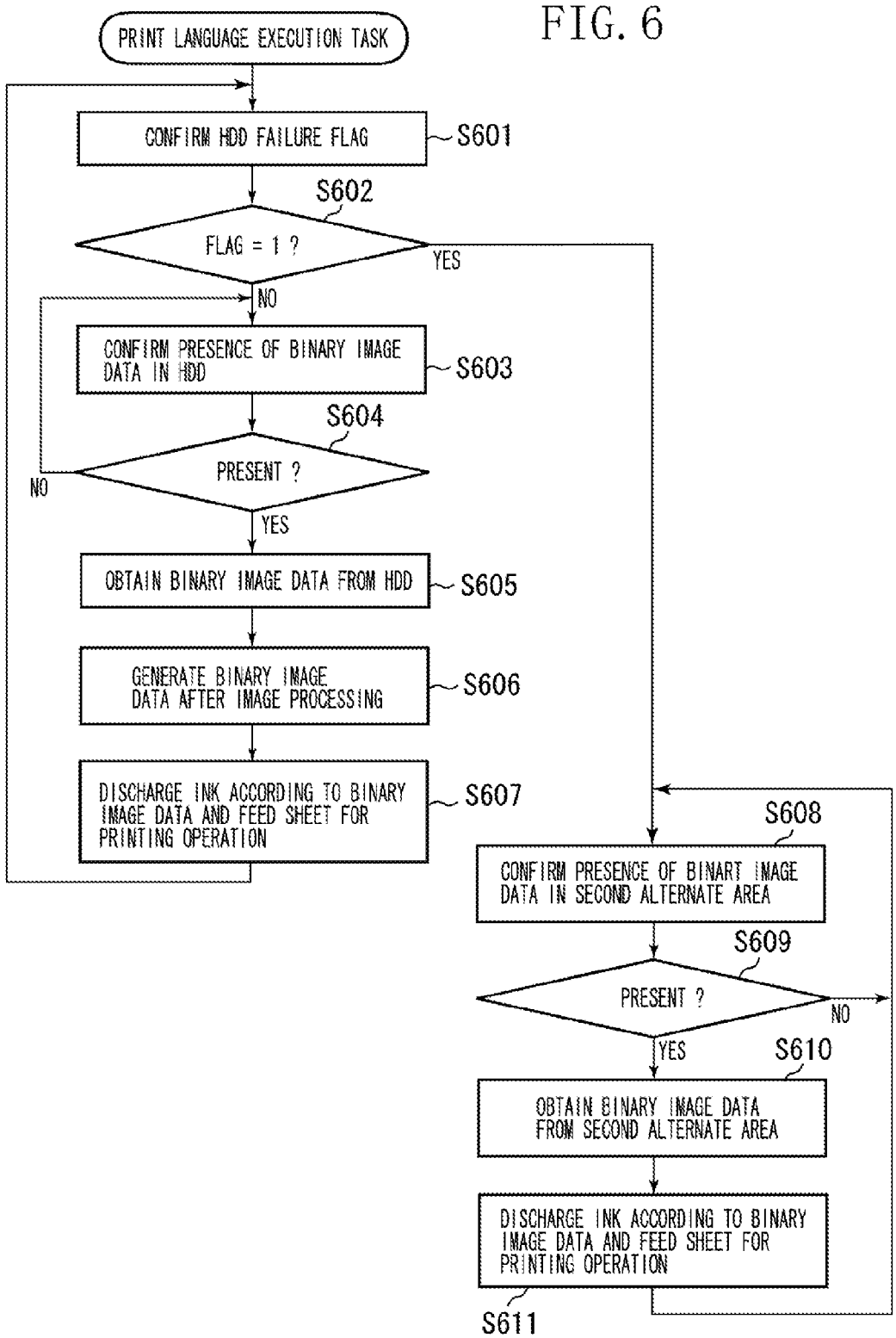
FIG. 6 is a flowchart illustrating a processing procedure of a print execution task according to an exemplary embodiment of the present invention.

FIG. 6 is a flowchart illustrating a processing procedure of a print execution task (print task) according to an exemplary embodiment of the present invention.

In step S601, the CPU 101 confirms the HDD failure flag 201.

In step S602, the CPU 101 determines whether the HDD failure flag 201 indicates "1." If the CPU 101 determines that the HDD failure flag 201 indicates "1" (YES in step S602), the processing flow proceeds to step S608. If the CPU 101 determines that the HDD failure flag 201 indicates "0" (NO in step S602), the processing flow proceeds to step S603. In step S603, the CPU 101 checks the presence of binary image data 207 stored in the HDD 104.

In step S604, the CPU 101 determines whether the binary image data 207 is present in the HDD 104. If the CPU 101 determines that the HDD 104 does not store the binary image data 207 (NO in step S604), the processing flow returns to step S603 to repeat the above-described processing.

If the CPU 101 determines that the HDD 104 stores the binary image data 207 (YES in step S604), the processing flow proceeds to step S605. In step S605, the CPU 101 reads (obtains) the binary image data 207 from the HDD 104. In step S606, the CPU 101 performs image processing on the read binary image data 207 and generates the processed binary image data 207 of each ink color. In step S607, the CPU 101 causes the motor drive control unit 105 and the printing head control unit 106 to perform a printing operation (i.e., discharge inks to a sheet) according to the generated binary image data 207. Then, the processing flow returns to step S601.

If the CPU 101 determines that the HDD failure flag 201 indicates "1" (YES in step S602), the processing flow proceeds to step S608. In step S608, the CPU 101 checks the presence of binary image data 207 stored in the second alternate area 204.

In step S609, the CPU 101 determines whether the binary image data 207 is present in the second alternate area 204. If the CPU 101 determines that the second alternate area 204 does not store the binary image data 207 (NO in step S609), the processing flow returns to step S608 to repeat the above-described processing. If the CPU 101 determines that the second alternate area 204 stores the binary image data 207 (YES in step S609), the processing flow proceeds to step S610.

In step S610, the CPU 101 reads (obtains) the binary image data 207 from the second alternate area 204. In step S611, the CPU 101 causes the motor drive control unit 105 and the printing head control unit 106 to perform a printing operation (i.e., discharge inks to a sheet) according to the read binary image data 207. Then, the processing flow returns to step S608.

The following is an exemplary processing procedure performed by the printing apparatus 100 in response to a turning-on operation of a power source.

Figure 7:
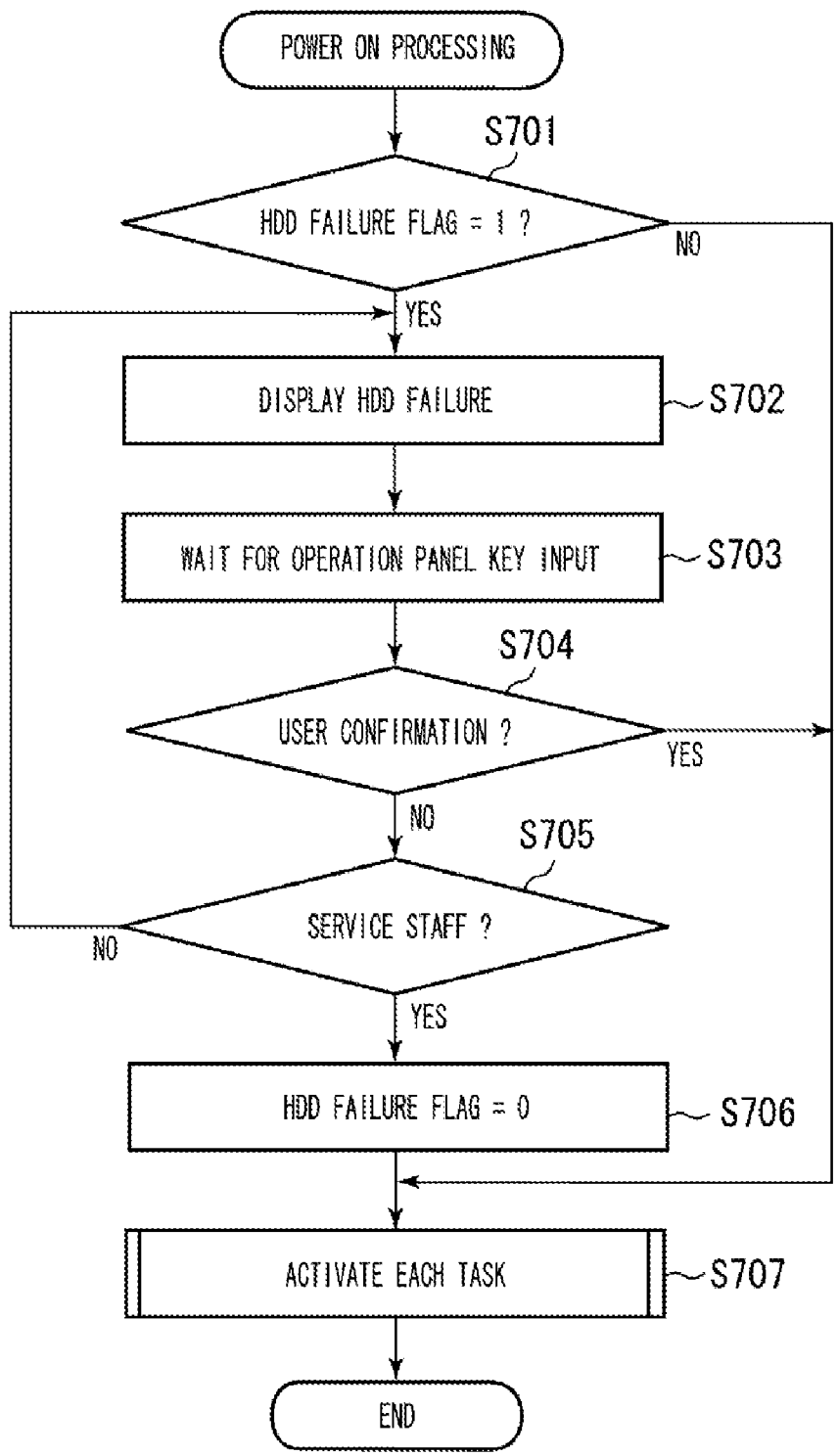
FIG. 7 is a flowchart illustrating a power-on processing procedure for the printing apparatus according to an exemplary embodiment of the present invention.

FIG. 7 is a flowchart illustrating a power-on processing procedure for the printing apparatus 100.

In step S701, the CPU 101 determines whether the HDD failure flag 201 indicates "1." If the CPU 101 determines that HDD failure flag 201 indicates "1" (YES in step S701), the processing flow proceeds to step S702. In step S702, the CPU 101 causes the liquid crystal operation panel unit 109 to display a message indicating "failure in HDD." In step S703, the CPU 101 waits for a user's instruction (key input) via the liquid crystal operation panel unit 109.

If the CPU 101 determines that the HDD failure flag 201 does not indicate "1" (NO in step S701), the processing flow proceeds to step S707. In step S707, the CPU 101 activates each task instructed by a processing procedure of the print data and terminates the power-on processing.

In step S704, the CPU 101 determines whether a key input is user's acceptance (confirmation). If the CPU 101 determines that the key input is user's acceptance (YES in step S704), the processing flow proceeds to step S707. In step S707, the CPU 101 activates each task instructed by a processing procedure of the print data and terminates the power-on processing.

In step S705, the CPU 101 determines whether a service staff key is operated (pressed). If the CPU 101 determines that the service staff key is operated (YES in step S705), the processing flow proceeds to step S706. In step S706, the CPU 101 sets the HDD failure flag to "0." Then, in step S707, the CPU 101 activates each task instructed by a processing procedure of the print data and terminates the power-on processing.

As described above, if the built-in HDD 104 fails in a situation where a user is not allowed to remove the HDD 104 from the printing apparatus 100, the printing apparatus 100 can change a transfer method of print image data. The printing apparatus 100 selects a data transfer method not using the HDD 104. Thus, a user can continuously use the printing apparatus 100.

Furthermore, if the printing apparatus 100 is started up in a state where the HDD 104 fails, the liquid crystal operation panel unit 109 displays a failure message that informs a user of a failure occurring in the HDD 104 and unavailability of the HDD 104 in a storage operation performed by the printing apparatus 100.

In the exemplary embodiment, the printing apparatus 100 refers to the HDD failure flag that indicates a state of failure in the HDD 104. However, instead of referring to the HDD failure flag, it is useful to use a unit that informs a user of no response from the HDD 104, or a unit that receives an error generation notice from the HDD 104.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-254661 filed Sep. 20, 2006, which is hereby incorporated by reference herein in its entirety.

What is claimed is:

1. A printing apparatus comprising:
an input unit configured to input print data;
a first memory configured to temporarily store the print data input by the input unit;
a converting unit configured to convert the print data to a predetermined format data;
a second memory configured to store the print data and the predetermined format data;
a printing unit configured to print an image based on the predetermined format data;
a first determining unit configured to determine whether the second memory is able to store the print data when the print data is input by the input unit before the converting unit converts the print data to the predetermined format data;
a second determining unit configured to determine whether the second memory is able to store the predetermined format data when the print data is converted to the predetermined format data by the converting unit; and
a control unit configured to cause the first memory to keep the print data input by the input unit without converting the print data to the predetermined format data by the converting unit in a case where the first determining unit determines the second memory is not able to store the print data, to cause the second memory to store the print data without converting the print data to the predetermined format data by the converting unit in a case where the first determining unit determines the second memory is able to store the print data, to cause the first memory to store the predetermined format data converted by the converting unit in a case where the second determining unit determines the second memory is not able to store the predetermined format data and to cause the second memory to store the predetermined format data converted by the converting unit in a case where the second determining unit determines the second memory is able to store the predetermined format data.

2. The apparatus according to claim 1, wherein the second memory is a built-in hard disk drive configured to operate as a mass storage device of the printing apparatus.

3. The apparatus according to claim 1, wherein the first and second determining units determine whether the second memory has failed.

4. The apparatus according to claim 1, wherein the control unit, in a case where the first or second determining unit determines the second memory is not able to store the print data or the predetermined format data, suspends execution of a next processing until a user's instruction is input.

5. A printing method comprising:
inputting print data;
storing the print data in a first memory temporarily;
converting the print data to a predetermined format data;
storing the print data and the predetermined format data in a second memory;
printing an image based on the predetermined format data;
determining whether the second memory is able to store the print data when the print data is input before the print data is converted to the predetermined format data;
determining whether the second memory is able to store the predetermined format data when the print data is converted to the predetermined format data; and
causing: (i) the first memory to keep the print data in a case where the second memory is determined not being able to store the print data without converting the print data to the predetermined format data, (ii) the second memory to store the print data in a case where the second memory is determined to be able to store the print data without converting the print data to the predetermined format data, (iii) the first memory to store the predetermined format in a case where the second memory is determined not being able to store the predetermined format data, and (iv) the second memory to store the predetermined format data in a case where the second memory is determined to be able to store the predetermined format data.

6. A non-transitory computer-readable storage medium having instructions that, when executed by a machine or a processor, cause the machine or the processor to perform operations comprising:

inputting print data;

storing the print data in a first memory temporarily;

converting the print data to a predetermined format data;

storing the print data and the predetermined format data in a second memory;

printing an image based on the predetermined format data;

determining whether the second memory is able to store the print data when the print data is input before the print data is converted to the predetermined format data;

determining whether the second memory is able to store the predetermined format data when the print data is converted to the predetermined format data; and causing: (i) the first memory to keep the print data in a case where the second memory is determined not being able to store the print data without converting the print data to the predetermined format data, (ii) the second memory to store the print data in a case where the second memory is determined to be able to store the print data without converting the print data to the predetermined format data, (iii) the first memory to store the predetermined format in a case where the second memory is determined not being able to store the predetermined format data, and (iv) the second memory to store the predetermined format data in a case where the second memory is determined to be able to store the predetermined format data.

* * * * *